Sept. 26, 1950 N. S. EDBERG 2,523,947
DISCHARGE MECHANISM FOR ENDLESS CONVEYERS
Filed May 13, 1948
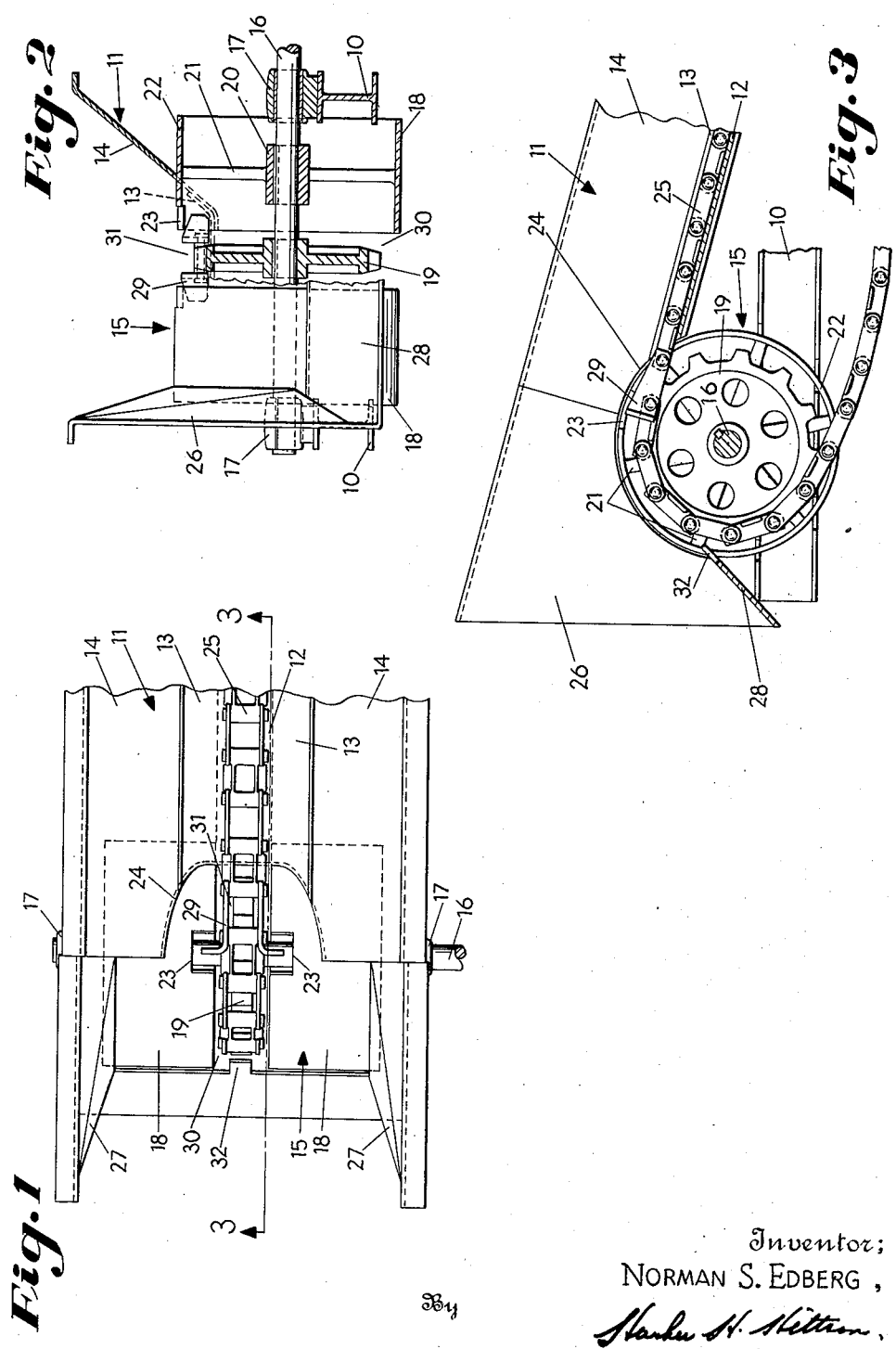
Inventor;
NORMAN S. EDBERG,
By
Attorney Patented Sept. 26, 1950

2,523,947

UNITED STATES PATENT OFFICE 2,523,947

DISCHARGE MECHANISM FOR ENDLESS CONVEYERS

Norman S. Edberg, Columbus, Ohio, assignor to The Jeffrey Manufacturing Company, a corporation of Ohio Application May 13, 1948, Serial No. 26,783

2 Claims. (Cl. 198—168)

My invention relates in general to endless conveyers and more particularly to a discharge mechanism therefor adapted to prevent conveyed material from catching on or between moving parts thereof and thereby damaging the conveyer.

One object of my invention is to provide an improved mechanism for an endless conveyer that is particularly adapted to prevent objects being conveyed from becoming caught between moving parts of the conveyer adjacent the discharge end thereof.

Another object of my invention is to provide an improved discharge wheel for a conveyer that is adapted to receive and carry the endless conveyer element of a conveyer with the endless element and its appurtenances lying substantially wholly within the radius of the wheel as they pass thereover.

Another object of my invention is to provide a discharge wheel assembly of the type set forth in the foregoing object wherein the discharge wheel assembly includes a shaft on which there are mounted two substantially identical drums, wheels or cylinders notched in their circumferential surfaces and a wheel or sprocket carried between the drums, wheels or cylinders that is of such diameter as to carry an endless conveyer element reeved thereover and its laterally extending flights substantially wholly within the radial confines of the drums, wheels or cylinders, the notches in the drums, wheels or cylinders receiving the laterally extending flights, and the drums, wheels or pulleys preferably, though not necessarily, being substantially hollow and open-ended in order that small pieces of conveyed material entering them by passing through their flight receiving notches and between their adjacent ends may be discharged from the drums, wheels or cylinders through their open ends.

Still another object of my invention is to provide an improved conveyer discharge portion or section including a conveyer trough and a discharge chute wherein a discharge wheel of the type set forth above forms a portion of the bottom of each and over which conveyed material is discharged from the conveyer trough into the discharge chute.

Other objects of the invention will appear hereinafter the novel features and combinations being set forth in the appended claims.

In the accompanying drawings:

Fig. 1 is a plan view in elevation of the discharge portion or section of an endless conveyer embodying my invention;

Fig. 2 is a view looking at the left side of the conveyer apparatus seen in Fig. 1 with parts broken away and in section to show constructional details thereof; and Fig. 3 is a view in section, the section being taken substantially on line 3—3 of Fig. 1.

Referring to the drawings, I have shown a discharge portion or section of an endless conveyer which has a main frame including two spaced notched I-beam type members 10 which extend longitudinally of the conveyer and support various parts thereof. A conveyer trough 11 extends above and between the I-beam type members 10 and this trough is formed of a bottom strip 12 the side edges 13 of which are bent to extend upwardly and outwardly. The side edges or portions 13 of the bottom strip 12 each lie upon and are secured to outwardly and upwardly extending trough side members 14 which are flanged outwardly in a horizontal plane at their top edges. The frame members 10 adjacent their outermost ends support or carry a conveyer discharge wheel, drum or pulley assembly 15 which assembly includes a shaft 16 that extends transversely of the conveyer trough 11 and the frame members 10 and is carried by the latter in bearings 17. Shaft 16, if desired, may be driven from any suitable source of power such as an electric motor through a belt and pulleys, not shown.

The conveyer discharge wheel, drum or pulley assembly 15 includes shaft 16 and a pair of spaced wheels, drums or cylinders 18 keyed thereon and between which there is keyed to the shaft 16 a sprocket 19. The drums 18 are substantially hollow and include hubs 20 having spokes 21 extending radially therefrom to a rim 22 each of which is notched as at 23 for a purpose hereinafter fully explained. The trough 11 adjacent the discharge wheel assembly 15 is cut as at 24 to conform to the cylindrical shape of the rims 22 of the cylinder-like wheel assembly 15 and the circumferential surface of the cylinder-like wheel assembly 15 co-operates in the cut-out portion 24 of the conveyer trough 11 to form the bottom thereof, that is, the rims 22 of the drums 18 extend laterally outwardly through or with respect to the side members 14 of the trough 11. An endless chain 25 operates or travels over the bottom strip 12 of the conveyer trough 11 and is reeved about the sprocket 19.

Referring particularly to Figs. 2 and 3 of the drawings, it is to be noted that material being conveyed in the trough 11 where its bottom portion is intersected by the round surface of the cylindrical wheel assembly 15 will be conveyed over the wheel assembly 15 and discharged therefrom into a discharge chute 26, which chute may be considered as a continuation of the conveyer trough 11. Discharge chute 26 includes opposite sloping walls 27 the lower edges of which conform to the slope of the cylindrical surface of the cylinders 18 and a bottom plate member 28. The sprocket 19 is of such diameter with respect to the drums or cylinders 18 that laterally extending flights 29 of chain 25 lie with their outermost radial edges within the radial confines of the rims 22 thereof as the chain enters the space or area 30 between the adjacent ends of cylinders 18 and as flights 29 and chain 25 travel around the cylindrical wheel assembly 15. The flights 29 are spaced upon the chain 25 at regular intervals such, for example, as six foot intervals and the rims 22 of the drums 18 have a circumferential measurement of six feet.

As seen in Fig. 3, the chain 25 is carried by the sprocket 19 of the wheel assembly 15 so that the laterally extending flights 29 of the chain 25 extend outwardly into the notches 23 of rims 22. The remaining smooth peripheral adjacent portions of the rims 22 are spaced apart only such a distance as is necessary to clear the chain 25. It will be seen that as the chain 25 travels toward the wheel assembly 15, as seen in Fig. 3, and as the flights 29 thereof approach the rims 22 of the drums 18, the notches 23 of rims 22 will receive or pass by the laterally extending portions of the flights 29, that is, as the link of the chain 25 which carries or includes the flights 29 enters upon the sprocket the notches 23 will straddle or pass by the laterally extending flight portions of the chain. This is also true, of course, at the point at which the chain link including the flights 29 leaves the wheel assembly 15. The flights 29 also extend upwardly or radially outwardly at the sprocket beyond the radial outermost edge of the links of chain 25 and, as herein shown, each of the flights as seen in Fig. 2 is formed of an outwardly bent plate which also forms a side link of that chain link which carries the flights 29. Because of this arrangement there is an unobstructed area 31 above the knuckles of the chain and between the upwardly or outwardly extending portions of the flights 29.

In order that the bottom member of plate 28 of the discharge chute 26 may as nearly as possible co-operate with the cylindrical surfaces of the wheel assembly 15 and chain 25 for closing the bottom of the discharge chute, a tab 32 is provided on the plate 28 which extends between the drums 18 to a point adjacent the radially outermost arc through which the chain links 25 pass as they rotate with the wheel assembly 15 and shaft 19. Tab 32 is of such width as to pass between the flights 29.

While I have shown and described the discharge wheel, drum or pulley 15 as an assembly, it is to be understood that they may, if desired, be formed of a single cylindrical drum the center portion of which is grooved, notched and provided with chain receiving sprocket teeth, as herein described.

The conveyer discharge portion or section of the invention may be used with particular advantage in the conveying of logs to be made into pulp at a paper mill. In conveying logs, the logs as they travel through the trough of the conveyer may lie in any position, in fact, it is not uncommon for them to stand on end and as they approach or reach my improved discharge portion or section they cannot become caught upon or jammed between parts thereof because the chain 25 travels substantially in a plane over the end of the conveyer trough 11 to the sprocket 19 and the logs are lifted upwardly by the cylindrical conveyer discharge wheel assembly 15 from the chain and its flights before the chain deviates from this plane to travel around the wheel assembly. Therefore the logs cannot become caught between the chain and the bottom of either the conveyer trough or discharge chute since the bottom portion of both where they connect with each other is a traveling cylindrical surface that rotates with the endless chain and which, except at the notched portions thereof, extends closely adjacent the sides of the conveyer chain. Because the chain and its flights lie substantially entirely within the radial confines of the cylindrical surface of the discharge wheel assembly and because, as the notches of the rims thereof pass outwardly beyond the flights to receive them, the cylindrical wheel assembly 15 functions as a device for lifting and/or stripping logs and chips upwardly from the chain as they approach the wheel assembly 15.

The drums 18 are preferably formed as hollow structures having open ends in order that small pieces or chips of the logs, of such size that they may enter the drums by passing through the notches 23 and/or between the sides of the chain and the adjacent edges of the drums, will be discharged from the drums through the open ends thereof, thus maintaining the teeth of the sprocket 19 as well as the links of the chain free of small pieces of the logs which might otherwise become jammed therebetween.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A discharge section of a log conveyer including a trough having a bottom and spaced upwardly and outwardly extending side walls, a discharge chute at the discharge end of said trough also including a bottom and spaced walls, a discharge wheel assembly positioned between said trough and chute, an endless chain conveyer element disposed centrally in said trough and adapted to travel over the bottom thereof, said endless chain conveyer element carrying flights extending laterally and upwardly from it, said chain and flights traveling centrally through said discharge wheel assembly, said discharge wheel assembly including a shaft, a pair of spaced substantially hollow cylindrical drums having open ends on said shaft extending laterally beyond the side walls of said trough, and a separate sprocket on said shaft between said cylindrical drums of such diameter that the upper outermost edges of the flights of said endless conveyer chain lie substantially wholly within the radius of said cylindrical drums as they travel with said discharge wheel assembly, each of said cylindrical drums having a notch in its circumferential surface adjacent said sprocket adapted to receive said flights as they approach and travel with said chain around said discharge wheel assembly, said drums being hollow and having open ends to discharge material entering them adjacent said conveyer element and sprocket at their outermost open ends.

2. A discharge section of a log conveyer including a trough having a bottom and spaced upwardly extending side walls, a discharge wheel assembly, an endless chain conveyer element disposed centrally in said trough and adapted to travel over the bottom thereof, said endless chain conveyer element carrying flights extending laterally and upwardly from it, said chain and flights traveling centrally through said discharge wheel assembly, said discharge wheel assembly including a shaft, a pair of spaced substantially hollow cylindrical drums having open ends on said shaft extending laterally beyond the side walls of said trough, and a separate sprocket on said shaft between said cylindrical drums of such diameter that the upper outermost edges of the flights of said endless conveyer chain lie substantially wholly within the radius of said cylindrical drums as they travel with said discharge wheel assembly, each of said cylindrical drums having a notch in its circumferential surface adjacent said sprocket adapted to receive said flights as they approach and travel with said chain around said discharge wheel assembly, said drums being hollow and having open ends to discharge material entering them adjacent said conveyer element and sprocket at their outermost open ends.

NORMAN S. EDBERG.

REFERENCES CITED

The following references are of record in the file of this patent:

UNITED STATES PATENTS

| Number | Name | Date |
|---|---|---|
| 211,605 | Torrent | Jan. 21, 1879 |
| 241,796 | Ewart | May 24, 1881 |
| 306,961 | Rundell | Oct. 21, 1884 |
| 435,025 | Schenck | Aug. 25, 1890 |
| 518,084 | Weber et al. | Apr. 10, 1894 |
| 835,526 | Horn | Nov. 13, 1906 |
| 1,031,202 | Sample et al. | July 2, 1912 |
| 2,227,557 | Sinden | Jan. 7, 1941 |